(12) United States Patent
Prabhakaran et al.

(10) Patent No.: US 12,006,051 B2
(45) Date of Patent: Jun. 11, 2024

(54) ELECTRICAL POWER SYSTEM FOR A VEHICLE

(71) Applicants: General Electric Company, Schenectady, NY (US); General Electric Deutschland Holding GmbH, Frankfurt (DE)

(72) Inventors: Satish Prabhakaran, Albany, NY (US); Mohamed Osama, Garching (DE)

(73) Assignees: General Electric Company, Schenectady, NY (US); General Electric Deutschland Holding GmbH, Frankfurt (DE)

( * ) Notice: Subject to any disclaimer, the term of this patent is extended or adjusted under 35 U.S.C. 154(b) by 0 days.

(21) Appl. No.: 17/730,683

(22) Filed: Apr. 27, 2022

(65) Prior Publication Data

US 2023/0348085 A1 Nov. 2, 2023

(51) Int. Cl.
| | | |
|---|---|---|
| *B64D 27/02* | (2006.01) | |
| *B64D 27/12* | (2006.01) | |
| *B64D 29/02* | (2006.01) | |
| *B64D 31/00* | (2006.01) | |

(52) U.S. Cl.
CPC ............ *B64D 31/00* (2013.01); *B64D 27/12* (2013.01); *B64D 29/02* (2013.01); *B64D 27/026* (2024.01); *B64D 2221/00* (2013.01)

(58) Field of Classification Search
None
See application file for complete search history.

(56) References Cited

U.S. PATENT DOCUMENTS

| | | |
|---|---|---|
| 5,694,765 A | 12/1997 | Hield et al. |
| 8,604,638 B2 | 12/2013 | Incerpi |
| 9,963,095 B2 | 5/2018 | Huang et al. |
| 10,038,397 B2 | 7/2018 | Cline et al. |
| 10,583,931 B2 | 3/2020 | Cline et al. |
| 10,797,628 B2 | 10/2020 | French et al. |
| 11,131,208 B2 | 9/2021 | Auker et al. |
| 11,139,716 B2 | 10/2021 | Husband et al. |
| 2013/0125561 A1* | 5/2013 | Schwarz .................. F02C 6/00 60/802 |

(Continued)

*Primary Examiner* — Timothy D Collins
*Assistant Examiner* — Terri L Filosi
(74) *Attorney, Agent, or Firm* — Dority & Manning, P.A.

(57) ABSTRACT

A vehicle includes a gas turbine engine having at least two spools and an associated power system. The power system includes two independent power subsystems, including a first power subsystem for managing power transfer between spools and a second power subsystem for supplying a base power load to the vehicle. The first power subsystem has a first electric machine mechanically coupled with a first spool of the gas turbine engine and a second electric machine mechanically coupled with a second spool. The second electric machine is electrically coupled with the first electric machine such that electrical power is transmittable therebetween. The second power subsystem has a third electric machine mechanically coupled with one of the spools. The third electric machine is electrically coupled with a load positioned offboard the gas turbine engine. The first power subsystem and the second power subsystem are electrically decoupled from one another.

13 Claims, 11 Drawing Sheets

(56) References Cited

U.S. PATENT DOCUMENTS

| | | | |
|---|---|---|---|
| 2014/0338352 A1* | 11/2014 | Edwards | F02C 3/113 |
| | | | 60/774 |
| 2017/0190434 A1* | 7/2017 | Dong | H02M 7/4835 |
| 2018/0362171 A1 | 12/2018 | Curchod | |
| 2020/0083791 A1* | 3/2020 | Latulipe | H02P 29/025 |
| 2021/0172334 A1 | 6/2021 | Brookes | |
| 2022/0042465 A1* | 2/2022 | Swann | F02C 9/00 |

* cited by examiner

ELECTRICAL POWER SYSTEM FOR A VEHICLE

FIELD

The present subject matter relates generally to an electrical power system for a vehicle, such as an aircraft.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing.

Recently, propulsion systems have been proposed of a hybrid-electric design. With such hybrid-electric propulsion systems, one or more of the turbofan jet engines can include one or more electric machines mechanically coupled thereto. Electric power generated by such electric machines may be provided to various aircraft loads, domestic engine loads, and for spool-to-spool power transfers. Power system architectures capable of effective and safe power generation and distribution would be a welcome addition to the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
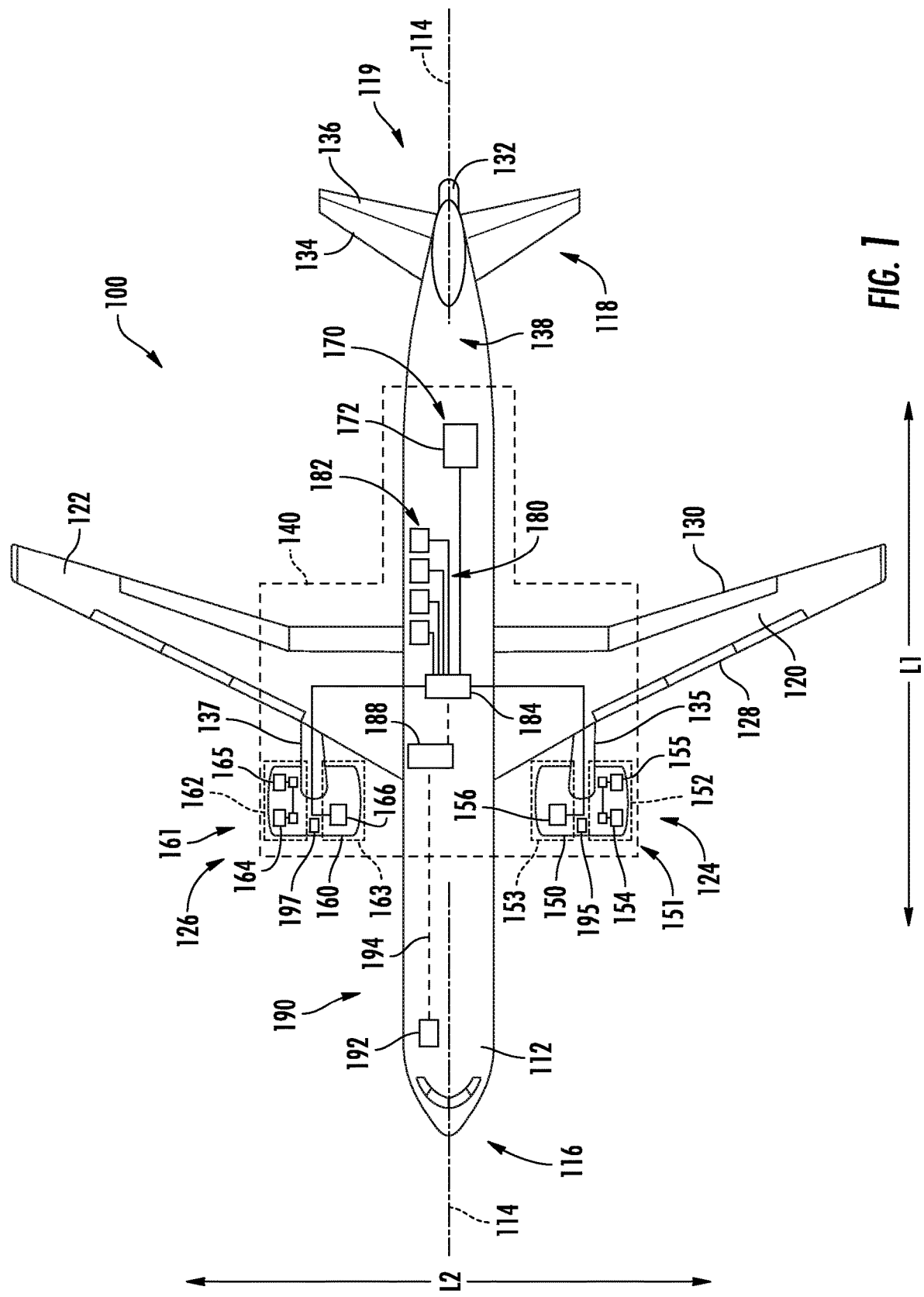
FIG. 1 is a top view of an aircraft according to various example embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to vehicle power systems. In one example aspect, a vehicle includes a gas turbine engine having at least two spools and an associated power system. The power system includes two independent power subsystems, including a first power subsystem for managing power transfer between spools of the gas turbine engine and a second power subsystem for supplying a base power load to the vehicle. The first power subsystem has a first electric machine mechanically coupled with a first spool of the gas turbine engine and a second electric machine mechanically coupled with a second spool. The second electric machine is electrically coupled with the first electric machine such that electrical power is transmittable therebetween, e.g., for power sharing. For instance, power from a low pressure spool can be directed to a high pressure spool. Power sharing may improve the operability of the gas turbine engine and enables fuel savings in parts of the mission cycle. For example, during ground idle, taxi modes and descent, power can be transferred from the low pressure spool to the high pressure spool.

The second power subsystem has a third electric machine mechanically coupled with one of the at least two spools of the gas turbine engine, such as the first spool, the second spool, or some other spool. The third electric machine is electrically coupled with the one or more electrical loads positioned offboard of the gas turbine engine such that electrical power is transmittable therebetween. The first power subsystem and the second power subsystem are electrically decoupled from one another. In this way, this arrangement decouples the engine power-transfer electrical system, or first power subsystem, from the base-load electrical power generation system, or second power subsystem.

The power system architectures provided herein may provide certain advantages, benefits, and technical effects. For instance, the power system architectures provided herein enable isolation of the transient effects of one power subsystem from the other. Moreover, the power system architectures provided herein may more readily accommodate airframer specifications for the base-load generator as it allows for the third electric machine or base-load generator to be controlled through traditional means to provide for aircraft electrical loads. That is, control of the third electric machine is not affected by power sharing operations. Further, the power system architectures provided herein allow for spool-to-spool power transfer without impacting the design of the aircraft electrical system architecture. Primary and secondary power distribution schemes may not need to be altered and the two power subsystems can be designed to operate at a voltage that is more optimal for each of them. In addition, the power system architectures provided herein are suited for both traditional bleed-based engines and for bleedless engines. Further, certain power system architectures provided herein include power converters that may eliminate or otherwise reduce the need for high voltage direct current (DC) cables and may significantly reduce the risk of a failure. The power system architectures provided herein may have other benefits and advantages than those expressly noted herein.

Turning now to the drawings, FIG. 1 provides a schematic top view of an aircraft 100 as may incorporate one or more inventive aspects of the present disclosure. As shown in FIG. 1, for reference, the aircraft 100 defines a longitudinal direction L1 and a lateral direction L2. The lateral direction L2 is perpendicular to the longitudinal direction L1. The aircraft 100 also defines a longitudinal centerline 114 that extends therethrough along the longitudinal direction L1. The aircraft 100 extends between a forward end 116 and an aft end 118, e.g., along the longitudinal direction L1.

The aircraft 100 includes a fuselage 112 that extends longitudinally from the forward end 116 of the aircraft 100 to the aft end 118 of the aircraft 100. The aircraft 100 also includes an empennage 119 at the aft end 118 of the aircraft 100. In addition, the aircraft 100 includes a wing assembly including a first, port side wing 120 and a second, starboard side wing 122. The first and second wings 120, 122 each extend laterally outward from the fuselage 112 with respect to the longitudinal centerline 114. The first wing 120 and a portion of the fuselage 112 together define a first side 124 of the aircraft 100 and the second wing 122 and another portion of the fuselage 112 together define a second side 126 of the aircraft 100. For the embodiment depicted, the first side 124 of the aircraft 100 is configured as the port side of the aircraft 100 and the second side 126 of the aircraft 100 is configured as the starboard side of the aircraft 100. The fuselage 112, the wings 120, 122, and the empennage 119 collectively form a vehicle body of the vehicle, or aircraft 100 for this embodiment.

The aircraft 100 includes various control surfaces. For this embodiment, each wing 120, 122 includes one or more leading edge flaps 128 and one or more trailing edge flaps 130. The aircraft 100 further includes, or more specifically, the empennage 119 of the aircraft 100 includes a vertical stabilizer 132 having a rudder flap (not shown) for yaw control and a pair of horizontal stabilizers 134 each having an elevator flap 136 for pitch control. The fuselage 112 additionally includes an outer surface or skin 138. It should be appreciated that, in other example embodiments of the present disclosure, the aircraft 100 may have a different configuration. For example, in other embodiments, the aircraft 100 may include any other control surface configuration.

The example aircraft 100 of FIG. 1 also includes a hybrid-electric propulsion system 140. For this embodiment, the hybrid-electric propulsion system 140 has a first gas turbine engine 150 and a second gas turbine engine 160 both operable to produce thrust. The first gas turbine engine 150 is mounted to the first wing 120 via a first pylon 135 and the second gas turbine engine 160 is mounted to the second wing 122 via a second pylon 137. Moreover, for the embodiment depicted, the first gas turbine engine 150 and second gas turbine engine 160 are each configured in an underwing-mounted configuration. However, in other example embodiments, one or both of the first and second gas turbine engines 150, 160 may be mounted at any other location in other example embodiments.

The first gas turbine engine 150 has at least two spools, such as a first spool and a second spool. The first gas turbine engine 150 can be any type of gas turbine engine, including a turbofan, turbojet, turboprop, turboshaft, etc. For this embodiment, the first gas turbine engine 150 is a ducted turbofan. As depicted, a first power system 151 is associated with the first gas turbine engine 150. The first power system 151 includes a first power subsystem 152 having a first electric machine 154 mechanically coupled with a first spool of the first gas turbine engine 150 and a second electric machine 155 mechanically coupled with a second spool of the first gas turbine engine 150. The second electric machine 155 is electrically coupled with the first electric machine 154 such that electrical power is transmittable therebetween, e.g., for power assist operations. In this regard, the first power subsystem 152 enables power transfer/sharing of power between spools of the first gas turbine engine 150. The first electric machine 154 and the second electric machine 155 can be directly mechanically coupled with their respective spools or indirectly, e.g., via respective gearboxes.

The first electric machine 154 and the second electric machine 155 can be electric generators, electric motors, or combination generator/motors. For this example embodiment, the first electric machine 154 and the second electric machine 155 are both combination generator/motors. Accordingly, the first electric machine 154 and the second electric machine 155 can operate in a generator mode to generate electrical power when driven by their respective spools or in a motor mode to drive their respective spools. In some instances, one electric machine can operate in a generator mode and the other electric machine can operate in a motor mode. The electrical power generated by the electric machine operating in the generator mode can be transmitted to the other electric machine operating in the motor mode. This transfer of power or power assist operation may be used to improve propulsive efficiency, enhance safety, or for other situations.

The first power system 151 also includes a second power subsystem 153 having a third electric machine 156 mechanically coupled with one of the spools of the first gas turbine engine 150, such as the first spool, the second spool, or another spool of the first gas turbine engine 150. The third electric machine 156 can be directly mechanically coupled with its spool or indirectly, e.g., via a gearbox. The third electric machine 156 can be an electric generator, an electric motor, or a combination generator/motor. For this embodiment, the third electric machine 156 is a combination generator/motor. The third electric machine 156 is electrically coupled with the one or more electrical loads 182 positioned onboard the fuselage 112 such that electrical power is transmittable therebetween. The third electric machine 156 can provide base load power to the aircraft 100, or rather to the one or more electrical loads 182 thereof. The third electric machine 156 can be the sole electric machine of the first gas turbine engine 150 that provides base load power to the one or more electrical loads 182. The third electric machine 156 can be controlled by the aircraft primary power distribution control system in accordance with the base load demands of the aircraft 100. For instance, the third electric machine 156 can be controlled by a supervisor controller 188.

Notably, the first power subsystem 152 and the second power subsystem 153 of the first power system 151 are electrically decoupled from one another. In this way, the first power subsystem 152 and the second power subsystem 153 are independent power systems. The first power subsystem 152 manages power transfer between spools of the first gas turbine engine 150 and the second power subsystem 153 supplies base power to the one or more electrical loads 182 of the aircraft 100. This arrangement decouples the base-load power generation system from the engine power-transfer electrical system.

Likewise, the second gas turbine engine 160 has at least two spools, such as a first spool and a second spool. The second gas turbine engine 160 can be any type of gas turbine engine, including a turbofan, turbojet, turboprop, turboshaft, etc. For this embodiment, the second gas turbine engine 160 is a ducted turbofan. As depicted, a second power system 161 is associated with the second gas turbine engine 160. The second power system 161 includes a first power subsystem 162 having a first electric machine 164 mechanically coupled with a first spool of the second gas turbine engine 160 and a second electric machine 165 mechanically coupled with a second spool of the second gas turbine engine 160. The second electric machine 165 is electrically coupled with the first electric machine 164 such that electrical power is transmittable therebetween, e.g., for power assist operations. In this regard, the first power subsystem 162 enables power transfer/sharing of power between spools of the second gas turbine engine 160. The first electric machine 164 and the second electric machine 165 can be directly mechanically coupled with their respective spools or indirectly, e.g., via respective gearboxes.

The first electric machine 164 and the second electric machine 165 can be electric generators, electric motors, or combination generator/motors. For this example embodiment, the first electric machine 164 and the second electric machine 165 are both combination generator/motors. Accordingly, the first electric machine 164 and the second electric machine 165 can operate in a generator mode to generate electrical power when driven by their respective spools or in a motor mode to drive their respective spools. In some instances, one electric machine can operate in a generator mode and the other electric machine can operate in a motor mode. The electrical power generated by the electric machine operating in the generator mode can be transmitted to the other electric machine operating in the motor mode. This transfer of power or power assist operation may be used to improve propulsive efficiency, enhance safety, or for other situations.

The second power system 161 also includes a second power subsystem 163 having a third electric machine 166 mechanically coupled with one of the spools of the second gas turbine engine 160, such as the first spool, the second spool, or another spool of the second gas turbine engine 160. The third electric machine 166 can be directly mechanically coupled with its spool or indirectly, e.g., via a gearbox. The third electric machine 166 can be an electric generator, an electric motor, or a combination generator/motor. For this embodiment, the third electric machine 166 is a combination generator/motor. The third electric machine 166 is electrically coupled with the one or more electrical loads 182 positioned onboard the fuselage 112 such that electrical power is transmittable therebetween. The third electric machine 166 can provide base load power to the aircraft 100, or rather to the one or more electrical loads 182 thereof.

The first power subsystem 162 and the second power subsystem 163 of the second power system 161 are electrically decoupled from one another. In this way, the first power subsystem 162 and the second power subsystem 163 are independent power systems. The first power subsystem 162 manages power transfer between spools of the second gas turbine engine 160 and the second power subsystem 163 supplies base power to the one or more electrical loads 182 of the aircraft 100. This arrangement decouples the base-load power generation system from the engine power-transfer electrical system.

The hybrid-electric propulsion system 140 further includes an electric energy storage system 170. The electric energy storage system 170 can include one or more electric energy storage devices, such as batteries, supercapacitor arrays, one or more ultracapacitor arrays, some combination of the foregoing, etc. For instance, for this embodiment, the electric energy storage system 170 includes a battery system 172 having one or more batteries. The battery system 172 can be electrically coupled with a voltage-regulating power supply, such as a DC/DC converter. In some embodiments, the DC/DC converter can be a bidirectional DC/DC converter. In this way, the DC/DC converter can control the electrical power drawn from the battery system 172 and the electrical power provided to the battery system 172 depending on whether it is desired to discharge or charge the battery system 172. The DC/DC converter can be positioned along the power bus 180.

A power distribution system 184 is positioned along the power bus 180. The power distribution system 184 can be controlled to distribute electrical power to the various electrical loads of the aircraft 100. As one example, electrical power generated by one or both of the third electric machines 156, 166 can be directed to the power distribution system 184 across the power bus 180, and the power distribution system 184 can distribute the electrical power to the one or more electrical loads 182, to the battery system 172, etc. As another example, electrical power drawn from the battery system 172 can be directed to the power distribution system 184 across the power bus 180, and the power distribution system 184 can distribute the electrical power to the one or more electrical loads 182, to the third electric machines 156, 166, etc. Various power converters can be positioned along the power bus 180 to convert the transmitted electrical power from alternating current to direct current, vice versa, or for conditioning the electrical power.

As depicted in FIG. 1, the one or more electrical loads 182 are positioned offboard the first and second gas turbine engines 150, 160. Indeed, the one or more electrical loads 182 are positioned onboard the fuselage 112 in FIG. 1. Thus, the one or more electrical loads 182 are not domestic loads of the first and second gas turbine engines 150, 160; rather the one or more electrical loads 182 are foreign electrical loads as they are not positioned onboard the gas turbine engines 150, 160. The one or more electrical loads onboard the first and second gas turbine engines 150, 160 will be deemed "domestic electrical loads" herein.

The one or more electrical loads 182 can include electrical loads in other locations than those shown in FIG. 1. For instance, the one or more electrical loads 182 can include electrical loads in the cockpit of the aircraft 100 (e.g., pilot flight controls, flight instruments, display screens, components in an avionics bay, etc.), in the empennage 119 or tail (e.g., lights, actuators for control surfaces, etc.), in the fuselage 112 (e.g., air conditioning, air cycle machines, lights, cabin accessories, etc.), and/or on the wings 120, 122 (e.g., for lights, actuators for control surfaces, etc.).

The power distribution system 184 and other controllable electrical elements of the hybrid-electric propulsion system 140 can be managed by a power management system. The power management system can include the supervisor controller 188 operable to control or provide data to the power distribution system 184 and the various converters along the power bus 180, among other elements. The converters can each include a controller operable to receive inputs from the supervisor controller 188, and based on such inputs, the controllers can cause the switching elements of the converters to perform a duty cycle, for example.

As further shown in FIG. 1, the supervisor controller 188 can form a part of a computing system 190 of the aircraft 100. The computing system 190 of the aircraft 100 can include one or more processors and one or more memory devices embodied in one or more computing devices. For instance, as depicted in FIG. 1, the computing system 190 includes the supervisor controller 188 as well as other computing devices, such as computing device 192, a first engine controller 195 associated with the first gas turbine engine 150, a second engine controller 197 associated with the second gas turbine engine 160, etc. The computing system 190 can include other computing devices as well. The computing devices of the computing system 190 can be communicatively coupled with one another via a communication network. For instance, computing device 192 is located in the cockpit of the aircraft 100 and is communicatively coupled with the supervisor controller 188 of the hybrid-electric propulsion system 140 via a communication link 194 of the communication network. The communication link 194 can include one or more wired or wireless communication links. For instance, one or more communication links can communicatively couple the computing device 192 and/or the supervisor controller 188 with the first engine controller 195 and/or the second engine controller 197 and/or controllers of the various power converters of the hybrid-electric propulsion system 140.

In other example embodiments, the hybrid-electric propulsion system 140 may have other configurations, and further, may be integrated into an aircraft 100 in any other manner. For example, in other embodiments, the hybrid-electric propulsion system 140 may have any number of gas turbine engines (such as one, two, three, four, etc.) distributed in any manner (such as along a port side wing, a starboard side wing, a fuselage of the aircraft, an aft location, etc.), and mounted in any manner (such as in an under-wing mount, an over-wing mount, integrated into a wing, mounted to a fuselage of the aircraft, mounted to a stabilizer of the engine, mounted at the aft end as a boundary layer ingestion engine, etc.).

Moreover, it will be appreciated that although the hybrid-electric propulsion system 140 described herein is depicted as having been incorporated into an aircraft, in other embodiments, the hybrid-electric propulsion system 140 may be incorporated into any other vehicle. For example, in other embodiments, the propulsion system may be incorporated into a nautical vehicle utilizing one or more turbine engines (such as a ship or submarine), a locomotive vehicle utilizing one or more turbine engines, a land-based vehicle utilizing one or more turbine engines, etc.

Figure 2:
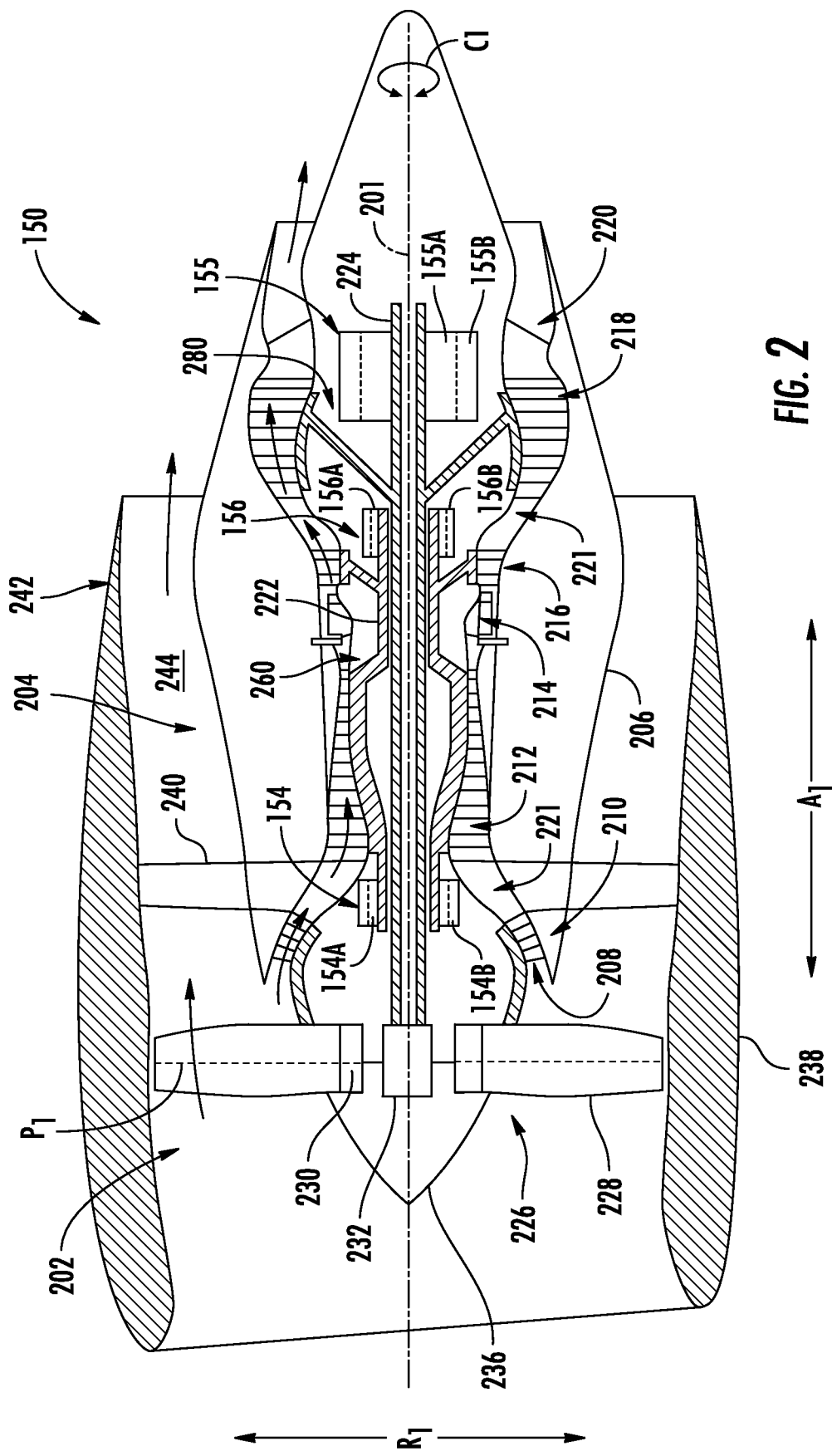
FIG. 2 is a schematic, cross-sectional view of a gas turbine engine mounted to the aircraft of FIG. 1.

Referring now to FIGS. 1 and 2, the first gas turbine engine 150 will now be described in further detail. FIG. 2 is a schematic, cross-sectional view of the first gas turbine engine 150. It will be appreciated that the second gas turbine engine 160 can be configured in a same or similar manner as the first gas turbine engine 150 depicted in FIG. 2. For reference, the first gas turbine engine 150 defines an axial direction A1 (extending parallel to a longitudinal centerline 201), a radial direction R1, and a circumferential direction C1 (extending around the longitudinal centerline 201).

The first gas turbine engine 150 includes a fan section 202 and a core turbine engine 204 (also referred to as the turbomachine) disposed downstream of the fan section 202. The core turbine engine 204 includes a substantially tubular engine cowl 206 that defines an annular core inlet 208. The engine cowl 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. The compressor section, combustion section 214, and turbine section together define a core air flowpath 221 extending from the annular core inlet 208 through the LP compressor 210, HP compressor 212, combustion section 214, HP turbine 216, LP turbine 218, and jet exhaust nozzle section 220. A high pressure (HP) shaft 222 drivingly connects the HP turbine 216 to the HP compressor 212. The HP shaft 222, the rotating components of the HP compressor 212 that are mechanically coupled with the HP shaft 222, and the rotating components of the HP turbine 216 that are mechanically coupled with the HP shaft 222 collectively form a high pressure spool 260. A low pressure (LP) shaft 224 drivingly connects the LP turbine 218 to the LP compressor 210. The LP shaft 224, the rotating components of the LP compressor 210 that are mechanically coupled with the LP shaft 224, and the rotating components of the LP turbine 218 that are mechanically coupled with the LP shaft 224 collectively form a low pressure spool 280.

The fan section 202 includes a fan 226 having a plurality of fan blades 228 coupled to a disk 230 in a spaced apart manner. As depicted, the fan blades 228 extend outwardly from the disk 230 generally along the radial direction R1. For the fan 226 of FIG. 2, each fan blade 228 is rotatable relative to the disk 230 about a pitch axis P1 by virtue of the fan blades 228 being mechanically coupled to an actuation member 232 configured to collectively vary the pitch of the fan blades 228 in unison. In this regard, the fan 226 of FIG. 1 is a variable pitch fan. The fan blades 228, disk 230, and actuation member 232 are together rotatable about the longitudinal axis 114 by the LP spool 280. In some other embodiments, the fan blades 228 may be fixed and not rotatable about their respective pitch axes. In this regard, the fan 226 can be fixed-pitch fan in such embodiments.

The disk 230 is covered by a spinner or rotatable front hub 236 aerodynamically contoured to promote an airflow through the plurality of fan blades 228. Additionally, the fan section 202 includes an outer nacelle 238 that circumferentially surrounds the fan 226 and/or at least a portion of the core turbine engine 204. The nacelle 238 is supported relative to the core turbine engine 204 by a plurality of circumferentially-spaced outlet guide vanes 240. A downstream section 242 of the nacelle 238 extends over an outer portion of the core turbine engine 204 so as to define a bypass airflow passage 244 therebetween.

It should also be appreciated that the first gas turbine engine 150 depicted in FIG. 2 is provided by way of example only, and that in other embodiments, the first gas turbine engine 150 may have a different configuration. For example, in other embodiments, the first gas turbine engine 150 may be configured as a turboprop engine, a turbojet engine, a differently configured turbofan engine, an unducted turbofan engine (e.g., without the nacelle 238, but including the stationary outlet guide vanes 240), or any other gas turbine engine. For instance, in some embodiments, the first gas turbine engine 150 may be a geared gas turbine engine (e.g., having a reduction gearbox between the LP shaft 224 and fan 226), may have any other number or configuration of shafts/spools (e.g., may include an intermediate speed shaft/turbine/compressor), etc.

In addition, as depicted in FIG. 2, the first gas turbine engine 150 includes at least three electric machines, including the first electric machine 154, the second electric machine 155, and the third electric machine 156. For this embodiment, the first electric machine 154 is mechanically coupled with the HP spool 260. The second electric machine 155 is mechanically coupled with the LP spool 280. The third electric machine 156 is mechanically coupled with the HP spool 260. In this manner, the first electric machine 154 and the third electric machine 156 are HP electric machines and the second electric machine 155 is an LP electric machine.

In at least some embodiments, the first electric machine 154 and/or the third electric machine 156 may be directly mechanically coupled to the HP spool 260. Similarly, the second electric machine 155 may be directly mechanically coupled to the LP spool 280. In FIG. 2, the first electric machine 154 and the third electric machine 156 are directly mechanically coupled to the HP spool 260 and the second electric machine 155 is directly mechanically coupled to the LP spool 280. Alternatively, in other embodiments, the first electric machine 154, the second electric machine 155, the third electric machine 156 or some combination thereof may be indirectly coupled to their respective HP spool 260 or LP spool 280, through a speed change mechanism (e.g., a gearbox, a transmission, or the like) to allow for a desired ratio of electric machine speed and spool speed.

Specifically, as shown in FIG. 2, the second electric machine 155 is co-axially mounted to and rotatable with the LP shaft 224 of the LP spool 280. As used herein, "co-axially" refers to the axes being aligned. Moreover, for the embodiment shown, the second electric machine 155 is positioned inward of the core air flowpath 221 along the radial direction R1 and is within or aft of the turbine section of the first gas turbine engine 150. As such, the second electric machine 155 may be referred to as an embedded electric machine. In other embodiments, the second electric machine 155 can be located in other locations, such as aft of the fan 226 and forward of the HP shaft 222 along the axial direction A1.

Similarly, the first electric machine 154 and the third electric machine 156 are both co-axially mounted to and rotatable with the HP shaft 222 of the HP spool 260. The first electric machine 154 and the third electric machine 156 are both positioned inward of the core air flowpath 221 along the radial direction R1, with the first electric machine 154 being positioned within the compressor section of the first gas turbine engine 150 and the third electric machine 156 being positioned within the turbine section of the first gas turbine engine 150. As such, the first electric machine 154 and the third electric machine 156 may be referred to as embedded electric machines. In other embodiments, the positions of the first electric machine 154 and the third electric machine 156 can be switched such that the third electric machine 156 is positioned within the compressor section and the first electric machine 154 is positioned within the turbine section.

The first electric machine 154 includes a rotor 154A and a stator 154B. The rotor 154A of the first electric machine 154 is mechanically coupled with the HP shaft 222 and is rotatable therewith. The stator 154B includes electric current-carrying elements, such as windings or coils. In this manner, electrical power can be transmitted to the electric current-carrying elements, and as will be appreciated, electrical energy can be converted into mechanical energy in motoring mode or vice versa in generating mode as the rotor 154A rotates relative to the stator 154B. The rotor 154A has rotor components for creating a rotor magnetic field in order to couple to the stator magnetic field to enable energy conversion. The rotor components of the rotor 154A can be, without limitation, rotor magnets in case of a permanent magnet synchronous machine, a squirrel cage in case of an induction machine, or a field winding in case of a field wound synchronous machine.

Likewise, the second electric machine 155 includes a rotor 155A and a stator 155B. The rotor 155A of the second electric machine 155 is mechanically coupled with the LP shaft 224 and is rotatable therewith. The rotor 155A and the stator 155B can be configured in any of the example manners described above with respect to the first electric machine 154. Similarly, the third electric machine 156 includes a rotor 156A and a stator 156B. The rotor 156A of the third electric machine 156 is mechanically coupled with the HP shaft 222 and is rotatable therewith. The rotor 156A and the stator 156B can be configured in any of the example manners described above with respect to the first electric machine 154.

In some alternative embodiments, an axis of the first, second, and/or third electric machines 154, 155, 156 may be offset radially from the axes of their respective shafts 222, 224. Further, in some embodiments, the first, second, and/or third electric machines 154, 155, 156 may be oriented oblique to the axes of their respective shafts 222, 224. Moreover, in other example embodiments, the first, second, and/or third electric machines 154, 155, 156 may be located outward of the core air flowpath 221, e.g., within the engine cowl 206 of the first gas turbine engine 150 or nacelle 238.

Figure 3:
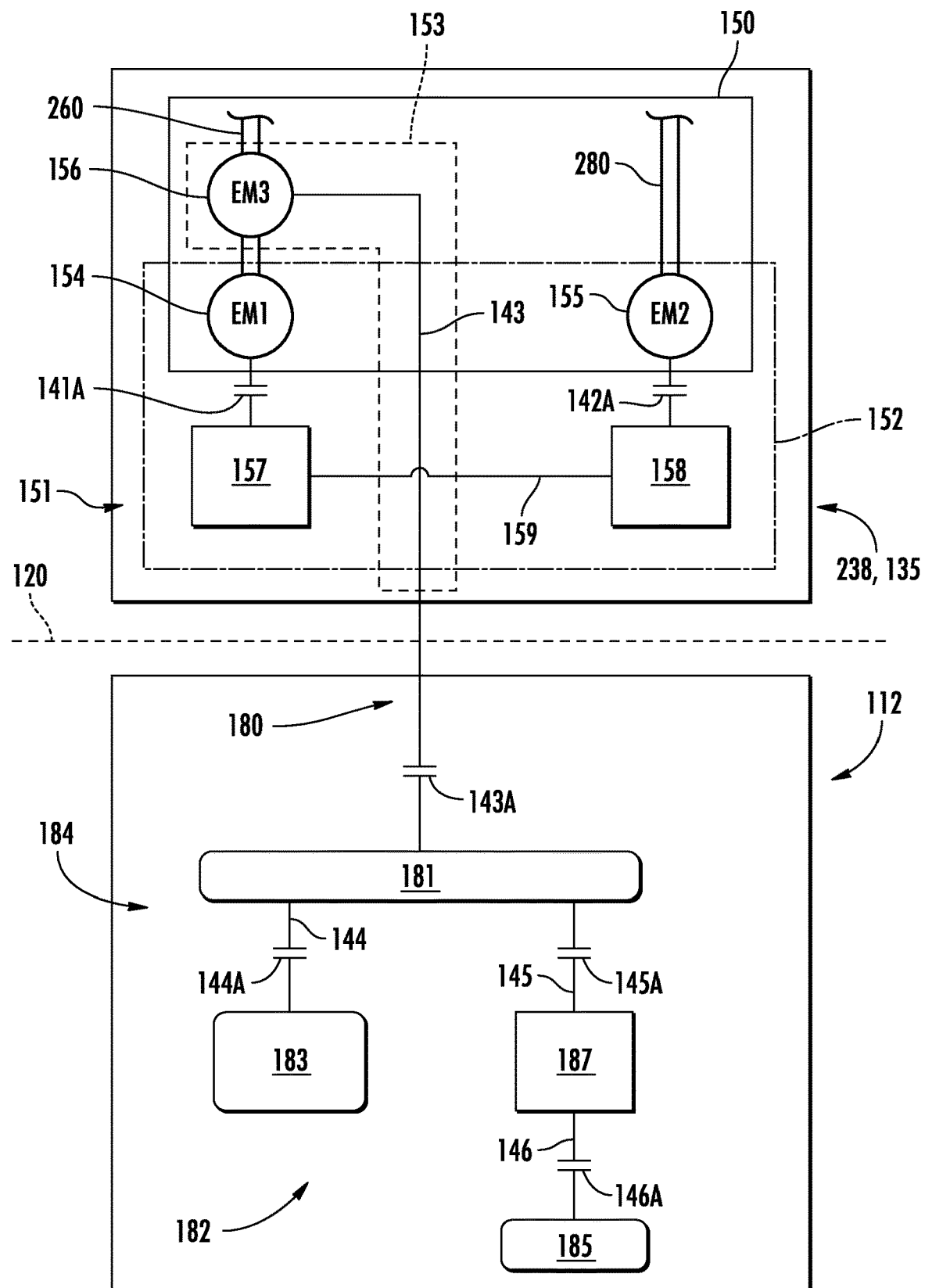
FIGS. 3 through 9 are schematic diagrams of various power systems for an aircraft according to example embodiments of the present disclosure.

FIG. 3 provides a schematic system diagram of the first power system 151 associated with the first gas turbine engine 150 and depicts the first power subsystem 152 and second power subsystem 153 thereof in more detail according to an example embodiment of the present disclosure. As depicted, the first gas turbine engine 150 has at least two spools, including a first spool and a second spool. For this embodiment, the first spool is the HP spool 260 and the second spool is the LP spool 280 of the first gas turbine engine 150.

The first power subsystem 152 includes the first electric machine 154 and the second electric machine 155. The first electric machine 154 (also denoted as "EM1" in FIG. 3) is mechanically coupled with the HP spool 260. The second electric machine 155 (also denoted as "EM2" in FIG. 3) is mechanically coupled with the LP spool 280.

The second electric machine 155 is electrically coupled with the first electric machine 154 such that electrical power is transmittable therebetween. Specifically, the first power subsystem 152 has a first power converter 157 electrically connected to the first electric machine 154 via a first line 141. The first power converter 157 can be a bidirectional converter, for example. The first line 141 can be an alternating current (AC) line and the first power converter 157 can be an AC/DC power converter, for example. A first contactor 141A is positioned along the first line 141 and may be controlled to selectively electrically couple or decouple the first electric machine 154 and the first power converter 157, e.g., in response to a detected failure associated with the first electric machine 154 and/or first power converter 157.

The first power subsystem 152 also has a second power converter 158 electrically connected to the second electric machine 155 via a second line 142. The second power converter 158 can be a bidirectional converter, for example. The second line 142 can be an AC line and the second power converter 158 can be an AC/DC power converter, for example. A second contactor 142A is positioned along the second line 142 and may be controlled to selectively electrically couple or decouple the second electric machine 155 and the second power converter 158, e.g., in response to a detected failure associated with the second electric machine 155 and/or second power converter 158.

For this embodiment, the first power converter 157 and the second power converter 158 are spaced from one another and are electrically coupled by a DC bus 159. Direct current can be transmitted across the DC bus 159 between the first power converter 157 and the second power converter 158. In other embodiments, the first power converter 157 and the second power converter 158 can be co-located and their respective terminals can be directly electrically connected such that direct current can be transmitted therebetween.

The first power subsystem 152 enables the transfer of power between the HP spool 260 and the LP spool 280. As one example, power can be transferred from the HP spool 260 to the LP spool 280. For instance, the HP spool 260 can drive the first electric machine 154 to generate electrical power. The generated electrical power can be transferred as alternating current from the first electric machine 154 to the first power converter 157 along the first line 141. The first power converter 157 can convert the alternating current into direct current. The first power converter 157 can rout the direct current to the second power converter 158 across the DC bus 159. The second power converter 158 can convert the direct current into alternating current. The second power converter 158 can rout the alternating current to the second electric machine 155 along the second line 142. The second electric machine 155 can then convert the electrical energy into mechanical energy to drive or motor the LP spool 280. In this way, the first power system 151 enables electrical power generated by the first electric machine 154 to be used by the second electric machine 155 to drive the LP spool 280.

As another example, power can be transferred from the LP spool 280 to the HP spool 260. For instance, the LP spool 280 can drive the second electric machine 155 to generate electrical power. The generated electrical power can be transferred as alternating current from the second electric machine 155 to the second power converter 158 along the second line 142. The second power converter 158 can convert the alternating current into direct current. The second power converter 158 can rout the direct current to the first power converter 157 across the DC bus 159. The first power converter 157 can convert the direct current into alternating current. The first power converter 157 can rout the alternating current to the first electric machine 154 along the first line 141. The first electric machine 154 can then convert the electrical energy into mechanical energy to drive or motor the HP spool 260. In this way, the first power system 151 enables electrical power generated by the second electric machine 155 to be used by the first electric machine 154 to drive the HP spool 260.

The first and second power converters 157, 158 may enable effective and safe electrical power transfer through the first power subsystem 152. Particularly, during operation, the first electric machine 154 and the second electric machine 155 produce AC voltages. These AC voltages can be of different amplitude, phase, and frequency by virtue of different torque-speed characteristics on the HP spool 260 and the LP spool 280. The first power converter 157 and the second power converter 158 help match the different AC voltage characteristics. The first power converter 157 and the second power converter 158 can convert the AC voltages produced by their respective first and second electric machines 154, 155 to a common DC voltage. The common DC voltage may readily be converted into an AC voltage having desired amplitude, phase, and frequency depending on the direction of flow through the first power subsystem 152.

The second power subsystem 153 includes the third electric machine 156. The third electric machine 156 (also denoted as "EM3" in FIG. 3) is mechanically coupled with the HP spool 260. The third electric machine 156 is electrically connected with a third line 143. The third line 143 can be an AC line of the power bus 180, for example. The third line 143 extends from the third electric machine 156 across the first wing 120 to a location onboard the fuselage 112. Particularly, the third line 143 is electrically connected with a main AC bus 181. The main AC bus 181 may operate in a variable frequency range of 360 Hz to 800 Hz, for example. A third contactor 143A is positioned along the third line 143 and may be controlled to selectively electrically couple or decouple the third electric machine 156 and the main AC bus 181, e.g., in response to a detected failure associated with the third electric machine 156. The third contactor 143A can be positioned onboard the fuselage 112 as shown in FIG. 3, or alternatively, the third contactor 143A can be positioned along the third line 143 onboard the nacelle 238 or the first pylon 135.

The one or more electrical loads 182 are electrically coupled with the main AC bus 181. As depicted in FIG. 3, one or more AC loads 183 of the one or more electrical loads 182 are electrically connected with the main AC bus 181 via a fourth line 144. A fourth contactor 144A is positioned along the fourth line 144 and may be controlled to selectively electrically couple or decouple the main AC bus 181 and the one or more AC loads 183, e.g., in response to a detected failure.

As further shown in FIG. 3, one or more DC loads 185 of the one or more electrical loads 182 are electrically coupled with the main AC bus 181. Particularly, a third power converter 187 is electrically connected to the main AC bus 181 via a fifth line 145. The fifth line 145 can be an AC line and the third power converter 187 can be an AC/DC power converter, for example. A fifth contactor 145A is positioned along the fifth line 145 and may be controlled to selectively electrically couple or decouple the main AC bus 181 and the third power converter 187, e.g., in response to a detected failure. A sixth line 146 electrically connects the third power converter 187 with the one or more DC loads 185. The sixth line 146 can be a DC line, for example. A sixth contactor 146A is positioned along the sixth line 146 and may be controlled to selectively electrically couple or decouple the third power converter 187 and the one or more DC loads 185, e.g., in response to a detected failure.

The second power subsystem 153 enables base load power generated by the third electric machine 156 to be provided to the one or more electrical loads 182. For instance, the HP spool 260 can drive the third electric machine 156 to generate electrical power. The generated electrical power can be transferred as alternating current from the third electric machine 156 positioned onboard the first gas turbine engine 150, across the first wing 120 along the third line 143, and to the main AC bus 181 positioned onboard the fuselage 112. The electrical power can be transmitted from the main AC bus 181 to the one or more AC loads 183 and to the one or more DC loads 185 of the one or more electrical loads 182. More specifically, electrical power can be transmitted from the main AC bus 181 to the one or more AC loads 183 along the fourth line 144 as alternating current. Electrical power can be transmitted from the main AC bus 181 along the fifth line 145 as alternating current, the third power converter 187 can convert the alternating current to direct current, and the electrical power can be transmitted from the third power converter 187 to the one or more DC loads 185 as direct current along the sixth line 146.

Advantageously, the first power subsystem 152 and the second power subsystem 153 of the first power system 151 are electrically decoupled from one another. Thus, the first power subsystem 152 and the second power subsystem 153 are independent power systems. The first power subsystem 152 is dedicated to managing power transfers between spools of the first gas turbine engine 150 and the second power subsystem 153 is dedicated to supplying base power to the one or more electrical loads 182 of the aircraft 100. This arrangement decouples the base-load power generation system from the engine power-transfer electrical system.

For the depicted embodiment of FIG. 3, the first power converter 157 and the second power converter 158 are positioned onboard the nacelle 238, the pylon 135, or both. Advantageously, by positioning the first power converter 157 and the second power converter 158 onboard the nacelle 238, the pylon 135, or both, shorter AC cables can be used for the first line 141 and the second line 142, smaller Electromagnetic Interference (EMI) filters can be used, and voltage transmission problems (e.g., voltage doubling) can be minimized or eliminated, etc.

Figure 4:
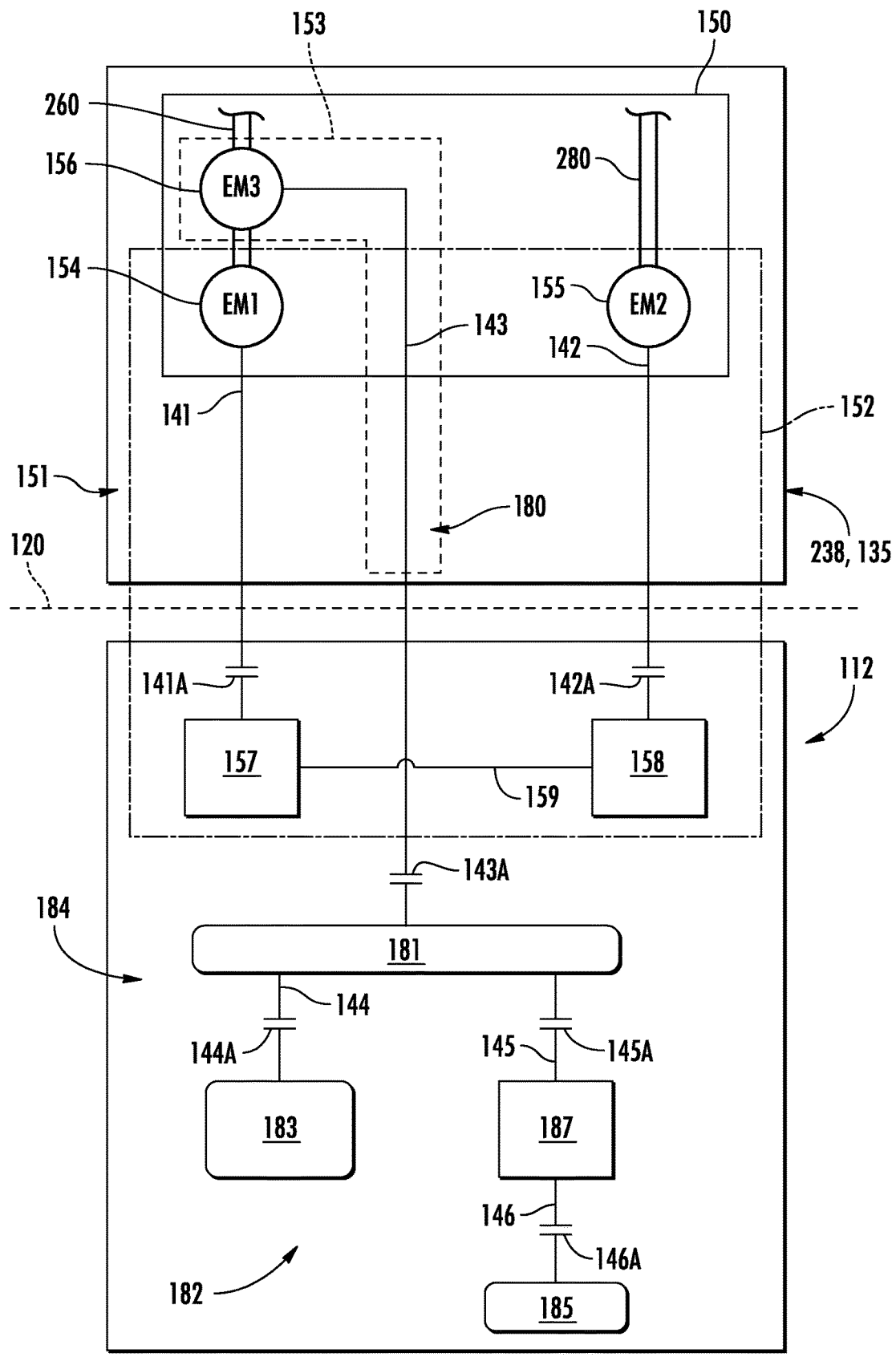

In alternative embodiments, as depicted in FIG. 4, the first power converter 157 and the second power converter 158 can be positioned offboard the nacelle 238, the pylon 135, or both. Stated differently, the first power converter 157 and the second power converter 158 can be positioned onboard the fuselage 112 as shown in FIG. 4. In this regard, the first line 141 and the second line 142 both extend from their respective first and second electric machines 154, 155 across the first wing 120 and onboard the fuselage 112. The first and second contactors 141A, 142A can be positioned onboard the fuselage 112 as well. Advantageously, by positioning the first power converter 157 and the second power converter 158 onboard the fuselage 112, the environment in which the first power converter 157 and the second power converter 158 can be controlled. For instance, the environment can be controlled to minimize vibration, partial discharge that may be caused by high altitude, torsional and fatigue stresses, etc.

Further, in some embodiments, the first power converter 157 and the second power converter 158 can be positioned onboard the fuselage 112 and can be co-located as opposed to spaced apart as shown in FIG. 4.

Figure 5:
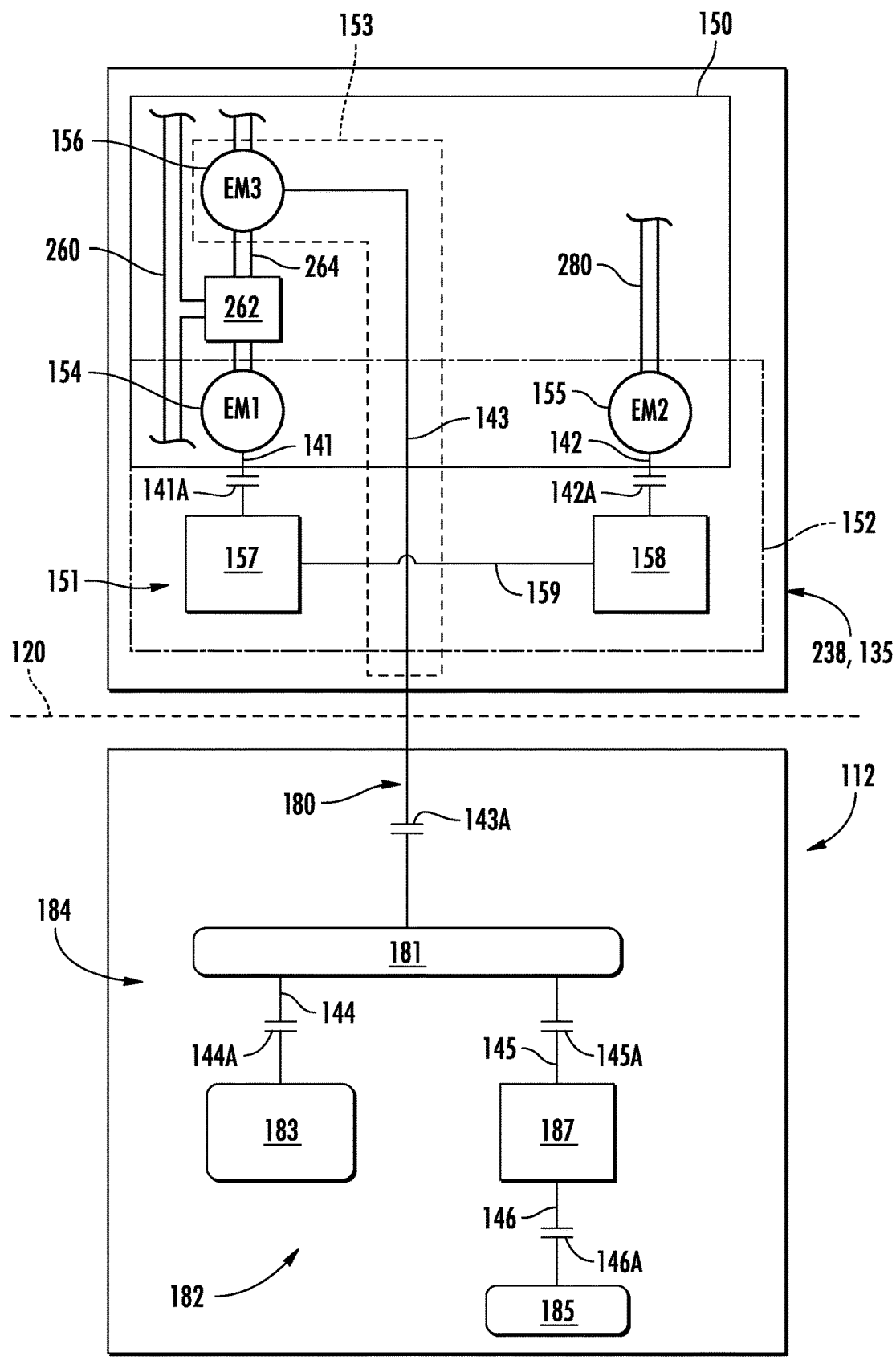

In other alternative embodiments, as depicted in FIG. 5, the first electric machine 154 and the third electric machine 156 can be indirectly coupled to the HP spool 260 through an accessory gearbox 262 of the first gas turbine engine 150 to allow for a desired ratio of electric machine speed and spool speed. The accessory gearbox 262 can include an output shaft 264 to which the first and third electric machines 154, 156 are mechanically coupled. The output shaft 264 can rotate at a different speed than the HP spool 260. The accessory gearbox 262 and the first and third electric machines 154, 156 can be positioned within the engine cowl 206 (FIG. 2) but outward of the core air flowpath 221 (FIG. 2) along the radial direction R1 (FIG. 2).

Figure 6:
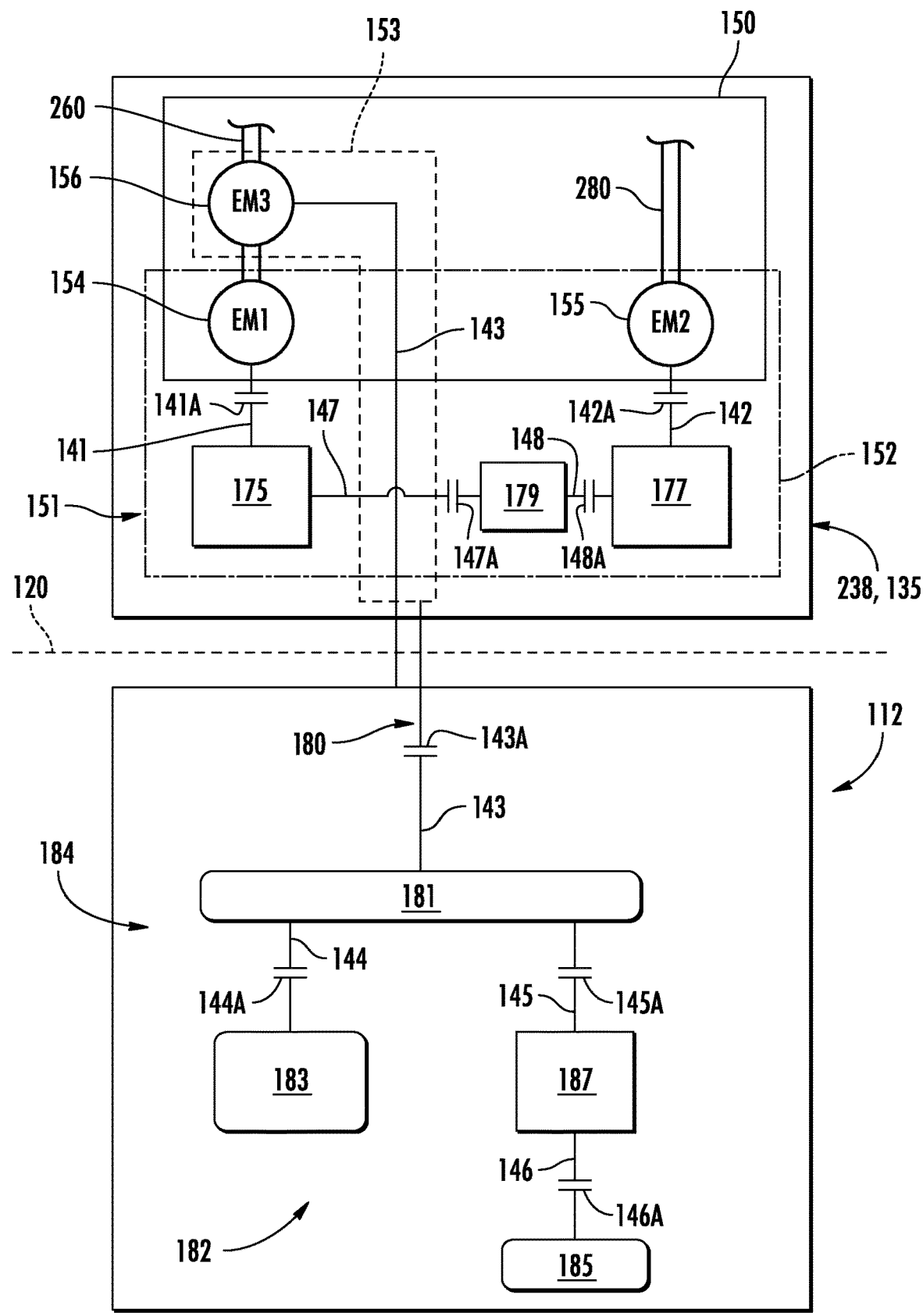

In some further alternative embodiments, as depicted in FIG. 6, the first power subsystem 152 can be configured as an AC system. Particularly, as shown in FIG. 6, the first line 141 can electrically connect the first electric machine 154 to a first AC bus 175. A seventh line 147, which is an AC line, can electrically connect the first AC bus 175 to an AC/AC converter 179. A seventh contactor 147A is positioned along the seventh line 147 and may be controlled to selectively electrically couple or decouple the first electric machine 154 and the first AC bus 175, e.g., in response to a detected failure. The second line 142 can electrically connect the second electric machine 155 to a second AC bus 177. An eighth line 148, which is an AC line, can electrically connect the second AC bus 177 to the AC/AC converter 179. An eighth contactor 148A is positioned along the eighth line 148 and may be controlled to selectively electrically couple or decouple the second electric machine 155 and the second AC bus 177, e.g., in response to a detected failure.

In some embodiments, the AC/AC converter 179 may be a matrix converter. In yet other embodiments, the AC/AC converter 179 may be a cycloconverter. Generally, the AC/AC converter 179 can be controlled to convert alternating current transferred therethrough so that the electric current has a synchronized frequency and voltage to the AC bus to which the electrical power is being transferred. The first AC bus 175 and the second AC bus 177 can have independent voltage levels, different frequencies, and may be out-of-phase with respect to one another. Accordingly, the AC/AC converter 179 can facilitate safe and smooth transition of electrical power from one AC bus to the other. Although the first AC bus 175, the second AC bus 177, and the AC/AC converter 179 are shown in FIG. 6 being positioned onboard the nacelle 238, the first pylon 135, or both, it will be appreciated that one or more of these components may be positioned onboard the fuselage 112 in alternative embodiments.

Figure 7:
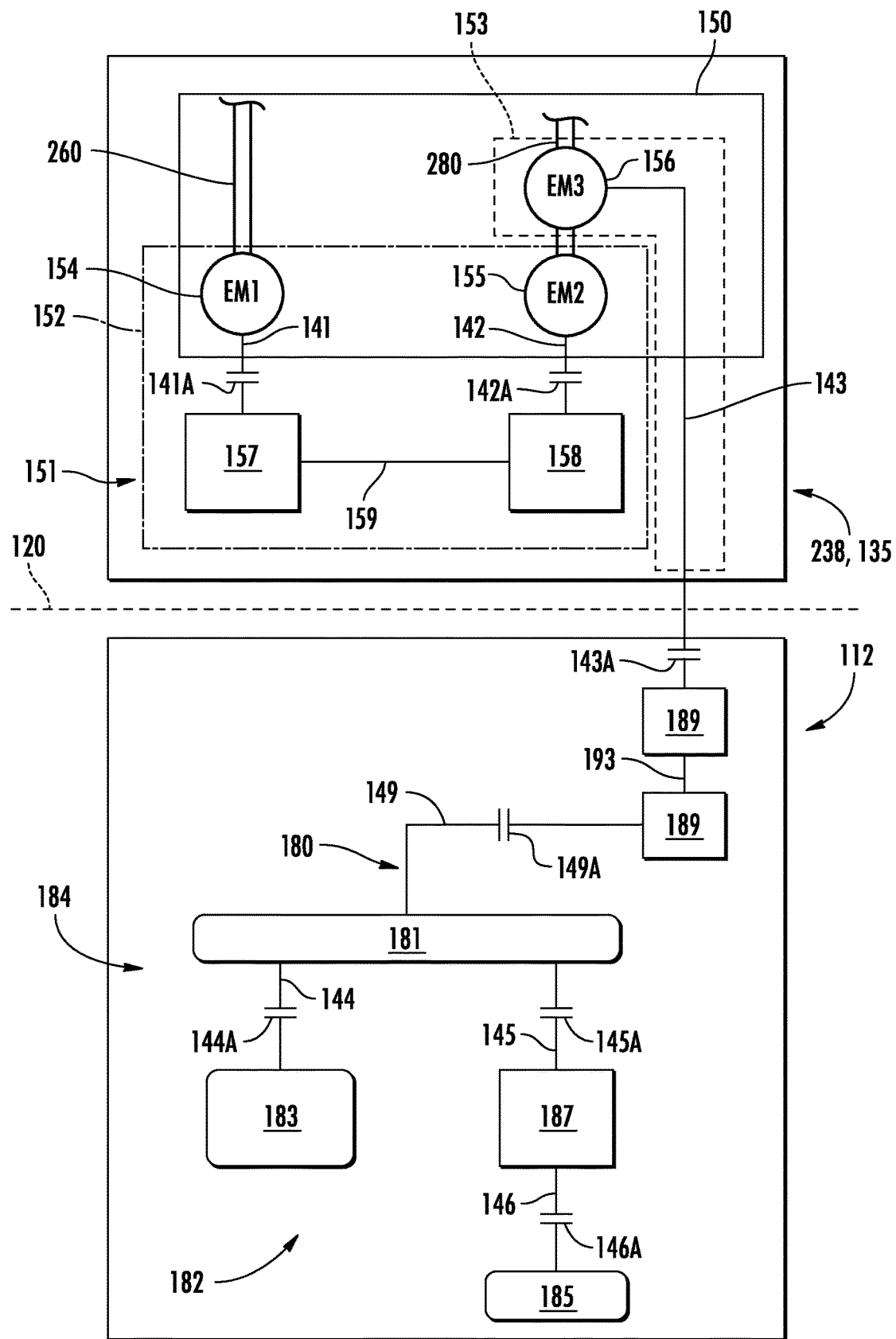
Figure 8:
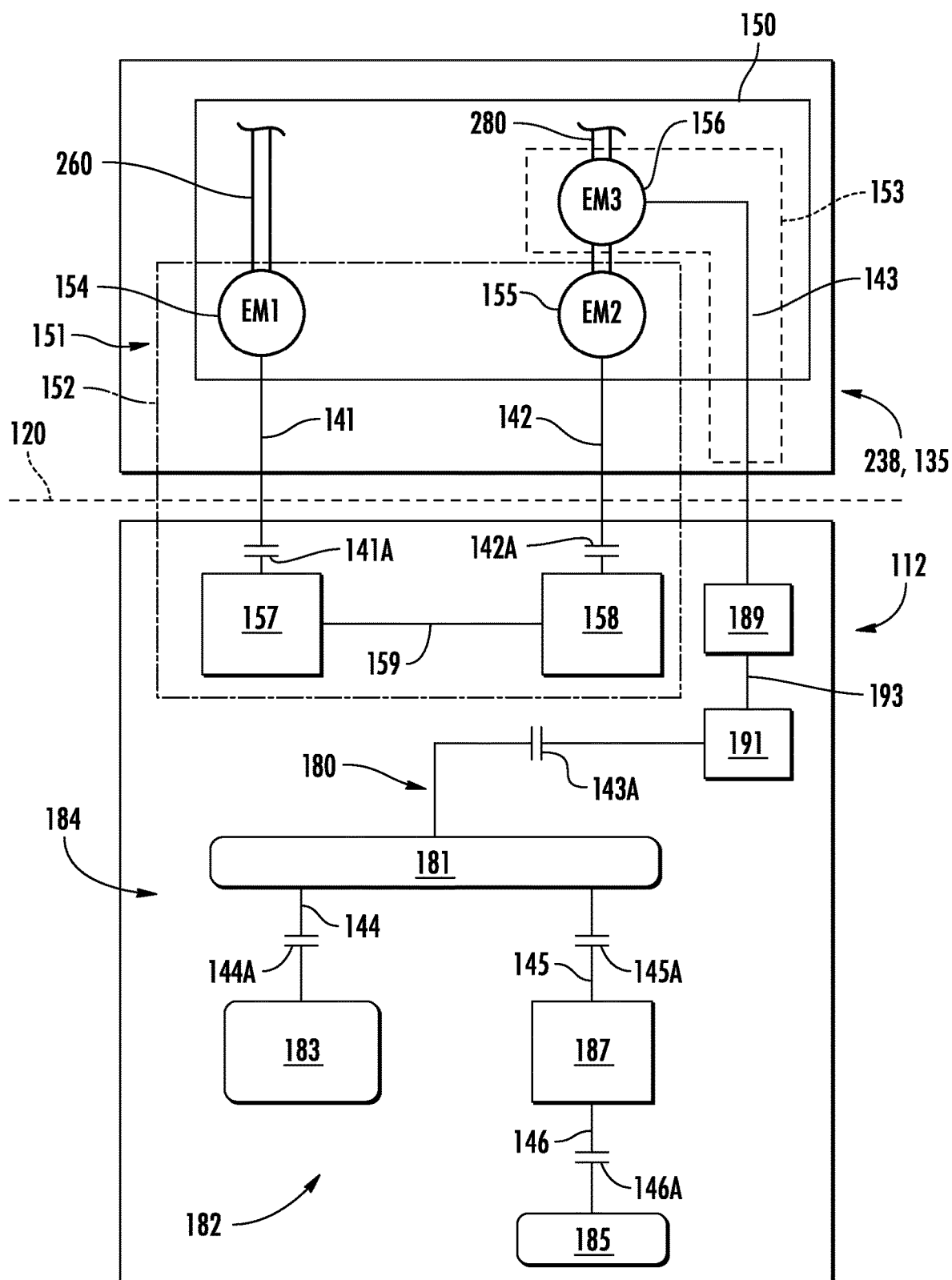

In some further alternative embodiments, as depicted in FIG. 7, the third electric machine 156 of the second power subsystem 153 can be mechanically coupled with the LP spool 280 (rather than the HP spool 260 as depicted in FIG. 3). In such embodiments, as shown in FIG. 7, the first power converter 157 and the second power converter 158 can both be positioned onboard the nacelle 238, the pylon 135, or both. In other embodiments, as shown in FIG. 8, the first power converter 157 and the second power converter 158 can both be positioned onboard the fuselage 112. In such embodiments, as depicted in FIG. 8, the first contactor 141A disposed along the first line 141 can be positioned onboard the fuselage 112 and the second contactor 142A disposed along the second line 142 can be positioned onboard the fuselage 112. In alternative embodiments with respect to FIG. 8, one or both of the first contactor 141A and the second contactor 142A can be positioned onboard the nacelle 238, the first pylon 135, or both.

In some further embodiments, a DC link can be included between the third electric machine 156 and the main AC bus 181. For instance, as illustrated in FIGS. 7 and 8, the third electric machine 156 is electrically connected to a fourth power converter 189 via the third line 143. The fourth power converter 189 is electrically connected to a fifth power converter 191 via a DC link 193. The fifth power converter 191 is electrically connected to the main AC bus 181 via a ninth line 149. The ninth line 149 can be an AC line, for example. A ninth contactor 149A is positioned along the ninth line 149 and may be controlled to selectively electrically couple or decouple the main AC bus 181 from the fifth power converter 191, e.g., in response to a detected failure.

The fourth power converter 189 can be configured to convert alternating current received from the third electric machine 156 to direct current. The fourth power converter 189 can rout the direct current along the DC link 193 to the fifth power converter 191. The fifth power converter 191 can convert the direct current back to alternating current. The fifth power converter 191 can rout the alternating current to the main AC bus 181 along the ninth line 149. Electrical power can be transmitted to the one or more electrical loads 182 as described previously. The DC link 193 may enable the ability to shorten the AC cables, which may lessen the insulation requirements of the system, among other possible benefits.

Figure 9:
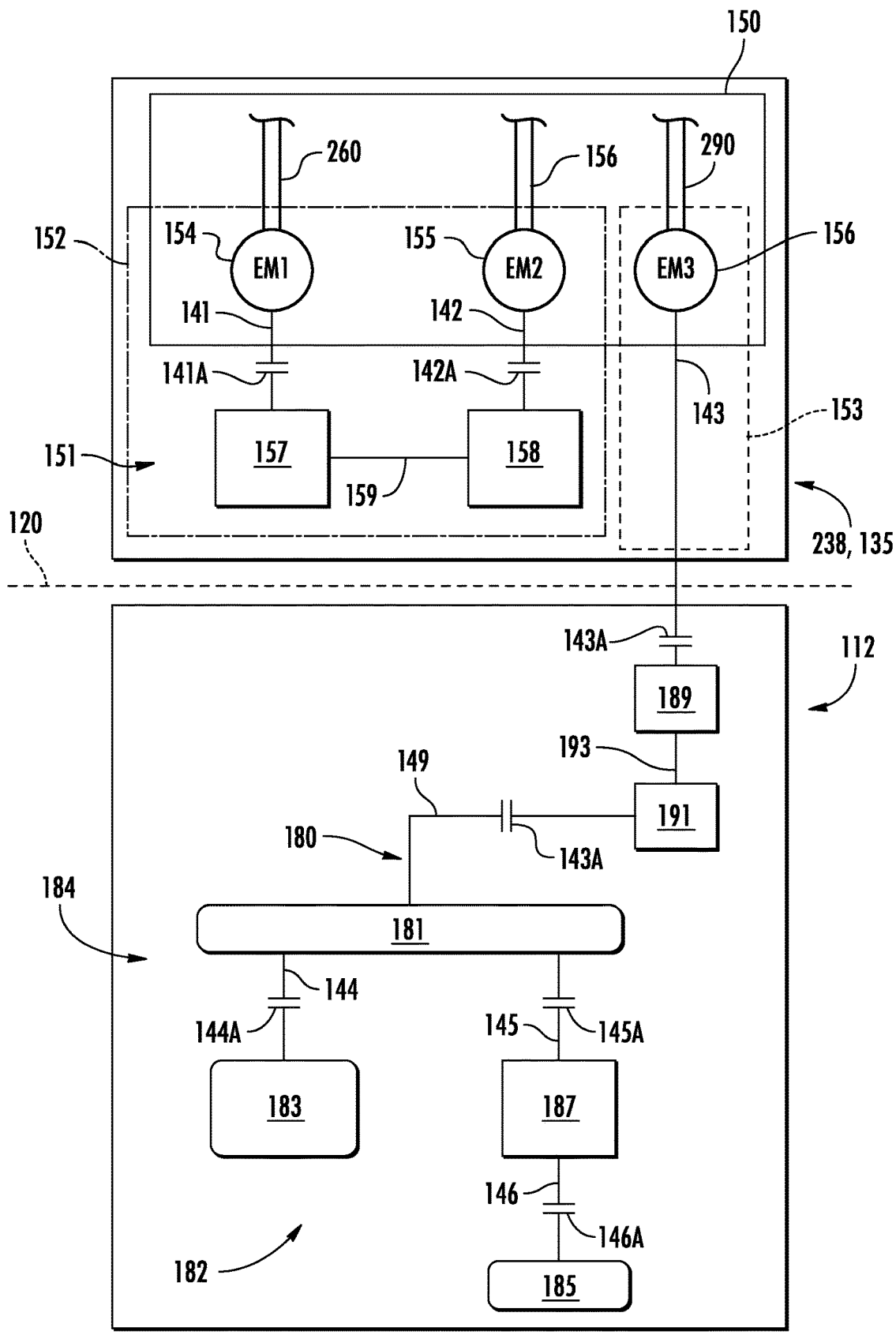

In some further embodiments, as depicted in FIG. 9, the first electric machine 154 is mechanically coupled with the HP spool 260, the second electric machine 155 is mechanically coupled with the LP spool 280, and the third electric machine 156 is mechanically coupled with an intermediate spool 290 of the first gas turbine engine 150. In other embodiments, the first electric machine 154 is mechanically coupled with the intermediate spool 290, the second electric machine 155 is mechanically coupled with the LP spool 280, and the third electric machine 156 is mechanically coupled with the HP spool 260 of the first gas turbine engine 150. In some further embodiments, the first electric machine 154 is mechanically coupled with the HP spool 260, the second electric machine 155 is mechanically coupled with the intermediate spool 290, and the third electric machine 156 is mechanically coupled with the LP spool 280 of the first gas turbine engine 150.

Although various embodiments of the first power system 151 associated with the first gas turbine engine 150 are depicted in FIGS. 3 through 9, it will be appreciated that the second power system 161 associated with the second gas turbine engine 160 of FIG. 1 can be configured in any of the configurations described herein and depicted in FIGS. 3 through 9. Further, in embodiments in which more than two gas turbine engines are provided, it will be appreciated that each multi-spool gas turbine engine can have an associated power system as provided herein. In embodiments in which only a single multi-spool engine is provided, it will be appreciated that the gas turbine engine can have an associated power system as provided herein.

Further, although the electric machines 154, 155, 156 have been described above and depicted in in FIGS. 3 through 9 as each being single electric machines, in some embodiments, one, some, or all of the electric machines 154, 155, 156 can include at least two electric machines both tied to or electrically coupled with the same power subsystem, e.g., for redundancy. In this regard, one, some, or all the electric machines 154, 155, 156 can be electric machine systems. For instance, in some embodiments, the first electric machine 154 can include at least two electric machines electrically coupled with the same power subsystem. Moreover, in some embodiments, the second electric machine 155 can include at least two electric machines electrically coupled with the same power subsystem. Further, in some embodiments, the third electric machine 156 can include at least two electric machines electrically coupled with the same power subsystem.

As one example, with reference to FIG. 5, the first electric machine 154 can include a first tied electric machine and a second tied electric machine. The first tied electric machine of the first electric machine 154 can be mechanically coupled with the output shaft 264 and electrically coupled with the first power subsystem 152. The second tied electric machine of the first electric machine 154 can be mechanically coupled with the output shaft 264 and/or the first tied electric machine of the first electric machine 154 and can be electrically coupled with the first power subsystem 152. Likewise, the third electric machine 156 can include a first tied electric machine and a second tied electric machine. The first tied electric machine of the third electric machine 156 can be mechanically coupled with the output shaft 264 and electrically coupled with the second power subsystem 153. The second tied electric machine of the third electric machine 156 can be mechanically coupled with the output shaft 264 and/or the first tied electric machine of the third electric machine 156 and can be electrically coupled with the second power subsystem 153. The second electric machine 155 can include one or more tied electric machines each being electrically coupled with the first power subsystem 152 as well. The tied electric machines of the second electric machine 155 can be mechanically coupled with one another.

Figure 10:
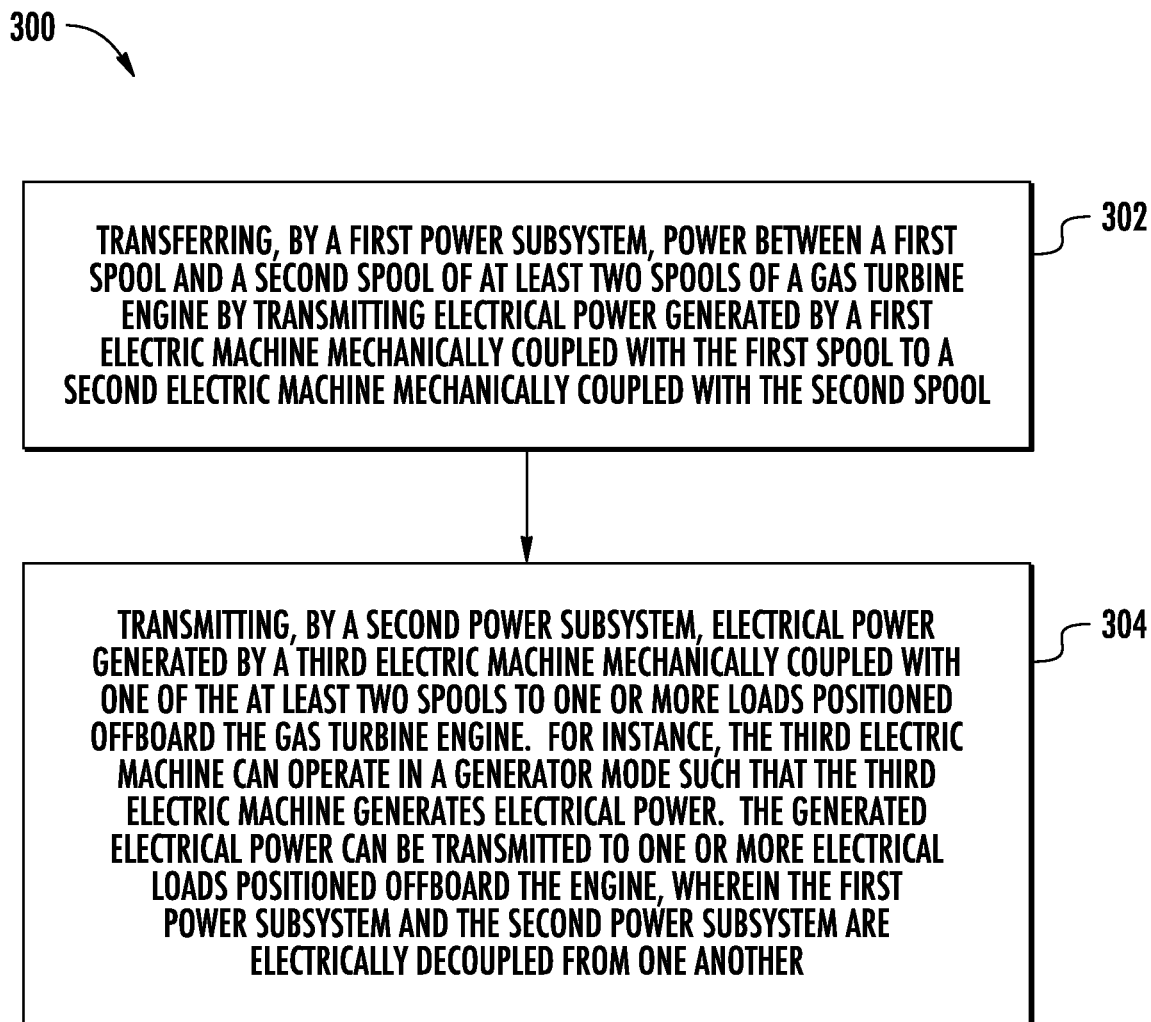
FIG. 10 is a flow diagram for a method of vehicle power transmission according to an example embodiment of the present disclosure.

FIG. 10 provides a flow diagram for a method 300 of vehicle power transmission according to one aspect of the present disclosure. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At 302, the method 300 includes transferring, by a first power subsystem, power between a first spool and a second spool of at least two spools of a gas turbine engine by transmitting electrical power generated by a first electric machine mechanically coupled with the first spool to a second electric machine mechanically coupled with the second spool. For instance, a power assist operation can be initiated, e.g., by a pilot/operator or automatically by a computing system of the vehicle. When the power assist operation is initiated, electrical power generated by one electric machine operating in a generator mode can be transmitted at the DC level (FIGS. 3 through 5 and FIGS. 7 through 9) or AC level (FIG. 6) to the other electric machine operating in a motoring or drive mode. The electrical power received by the electric machine can cause the electric machine to drive or motor its associated spool. One or more power converters of the first power subsystem can control the flow of electrical power from one electric machine to the other, e.g., by rapid switching of the switching elements thereof. A computing device associated with the cockpit controls and/or a supervisor controller or other bus power controller can communicate with controllers of power converters associated with the first and second electric machines and/or the first and second electric machines themselves to control the direction and flow of electrical power through the first power subsystem, e.g., to implement the power assist operation.

At 304, the method 300 includes transmitting, by a second power subsystem, electrical power generated by a third electric machine mechanically coupled with one of the at least two spools to one or more loads positioned offboard the gas turbine engine. For instance, the third electric machine can operate in a generator mode such that the third electric machine generates electrical power. The generated electrical power can be transmitted to one or more electrical loads positioned offboard the engine. In some implementations, the actions at 302 and 304 can occur simultaneously. A supervisor controller or other bus power controller can communicate with a controller of a power converter associated with the third electric machine and/or the third electric machine itself to control the direction and flow of electrical power through the second power subsystem and to the one or more loads positioned offboard the gas turbine engine.

In such implementations, the first power subsystem and the second power subsystem are electrically decoupled from one another. Accordingly, the first power subsystem and the second power subsystem can be independent power systems. The first power subsystem is operable to manage power transfer between the spools of the gas turbine engine and the second power subsystem is operable to supply base power to the one or more electrical loads positioned offboard the gas turbine engine. This arrangement decouples the base-load power generation system from the engine power-transfer electrical system.

Further, in some implementations, the third electric machine is mechanically coupled to one of the first spool and the second spool. For example, in some implementations, the first spool is a high pressure spool and the second spool is a low pressure spool of the gas turbine engine. In such implementations, the third electric machine is mechanically coupled with the first or high pressure spool or with the second or low pressure spool.

In other implementations, the first electric machine, the second electric machine, and the third electric machine are each coupled to a different spool of the gas turbine engine. In such implementations, the third electric machine is mechanically coupled with a spool that is not the first or second spool. For instance, the third electric machine can be mechanically coupled with an intermediate spool whereas the first electric machine can be mechanically coupled with a high pressure spool and the second electric machine can be mechanically coupled with a low pressure spool.

Figure 11:
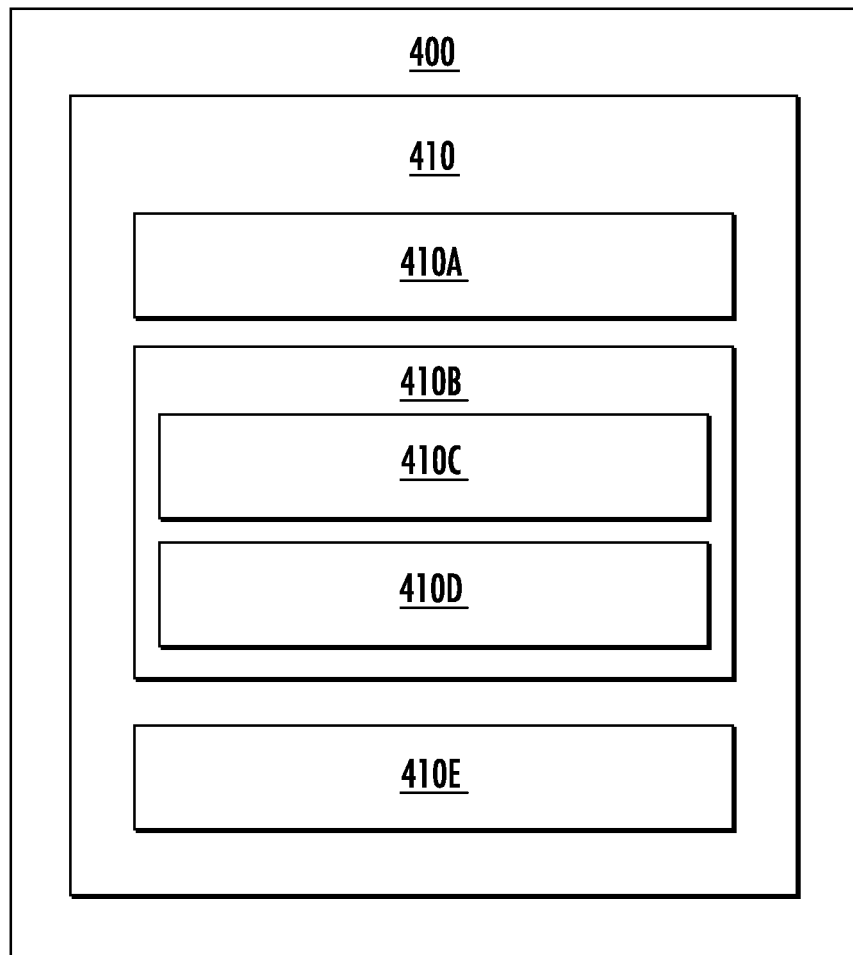
FIG. 11 is a system diagram of a computing system according to example embodiments of the present disclosure.

FIG. 11 provides an example computing system 400 according to example embodiments of the present disclosure. The computing elements or systems described herein can include one, some, or all the components of computing system 400 and can execute operations as described below.

As shown in FIG. 11, the computing system 400 can include one or more computing device(s) 410. The computing device 192, the first and second engine controllers 195, 197, the supervisor controller 188, the controllers controlling the various power converters, etc. may embody one or more of the components of the computing device 410. The computing device(s) 410 can include one or more processor(s) 410A and one or more memory device(s) 410B. The one or more processor(s) 410A can include any processing device, such as a microprocessor, microcontroller, integrated circuit, logic device, and/or other suitable processing device. The one or more memory device(s) 410B can include one or more computer-readable media, including, but not limited to, non-transitory computer-readable media, RAM, ROM, hard drives, flash drives, and/or other memory devices.

The one or more memory device(s) 410B can store information accessible by the one or more processor(s) 410A, including computer-executable or computer-readable instructions 410C that can be executed by the one or more processor(s) 410A. The instructions 410C can be any set of instructions that when executed by the one or more processor(s) 410A, cause the one or more processor(s) 410A to perform operations. In some embodiments, the instructions 410C can be executed by the one or more processor(s) 410A to cause the one or more processor(s) 410A to perform operations, such as any of the operations and functions for which the computing system 400 and/or the computing device(s) 410 are configured. The instructions 410C can be software written in any programming language or can be implemented in hardware. Additionally, and/or alternatively, the instructions 410C can be executed in logically and/or virtually separate threads on processor(s) 410A. The memory device(s) 410B can further store data 410D that can be accessed by the processor(s) 410A.

The computing device(s) 410 can also include a network interface 410E used to communicate, for example, with the other components of system 400 (e.g., via a network). The network interface 410E can include components for interfacing with one or more network(s), including for example, transmitters, receivers, ports, controllers, antennas, and/or other suitable components. One or more controllable devices (e.g., bus tie contactors, power converters, etc.) can be configured to receive one or more commands from the computing device(s) 410 or provide one or more commands to the computing device(s) 410.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Further, the inventive aspects of the present disclosure can be implemented on any vehicle. For instance, the inventive aspects can be implemented on an aircraft, such as a helicopter or fixed-wing aircraft, automobile, boat, submarine, train, amphibious vehicle, unmanned aerial vehicle or drone, and/or on any other vehicle. While the present disclosure is described herein with reference to an aircraft implementation, this is intended only to serve as an example and not to be limiting. One of ordinary skill in the art would understand that the inventive aspects of the present disclosure can be implemented on other vehicles without deviating from the scope of the present disclosure.

The power system architectures provided herein may provide certain advantages, benefits, and technical effects, such as isolating transient effects of one power subsystem from the other, accommodating airframer specifications for the base-load generator as it allows for the third electric machine or base-load generator to be controlled through traditional means to provide for aircraft electrical loads, and allow for spool-to-spool power transfer without impacting the design of the aircraft electrical system architecture. Further, primary and secondary power distribution schemes may not need to be altered and the two power subsystems can be designed to operate at a voltage that is more optimal for each of them. In addition, the power system architectures provided herein are suited for both traditional bleed-based engines and for bleedless engines. Further, certain power system architectures provided herein include power converters that may eliminate or otherwise reduce the need for high voltage DC cables and may significantly reduce the risk of a failure. The power system architectures provided herein may have other benefits and advantages than those expressly noted herein.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

1. A power system associated with a gas turbine engine mounted to a vehicle, the power system comprising: a first power subsystem having a first electric machine mechanically coupled with a first spool of at least two spools of the gas turbine engine and a second electric machine mechanically coupled with a second spool of at least two spools of the gas turbine engine, the second electric machine being electrically coupled with the first electric machine such that electrical power is transmittable therebetween; and a second power subsystem having a third electric machine mechanically coupled with one of the at least two spools, the third electric machine being electrically coupled with one or more electrical loads positioned offboard the gas turbine engine, and wherein the first power subsystem and the second power subsystem are electrically decoupled from one another.

2. The power system of any preceding clause, wherein the first spool is a high pressure spool and the second spool is a low pressure spool of the gas turbine engine, and wherein the third electric machine is mechanically coupled with the first spool.

3. The power system of any preceding clause, wherein the gas turbine engine further comprises an accessory gearbox mechanically coupling one or both of the first electric machine and the third electric machine to the high pressure spool.

4. The power system of any preceding clause, wherein the first spool is a high pressure spool and the second spool is a low pressure spool of the gas turbine engine, and wherein the third electric machine is mechanically coupled with the second spool.

5. The power system of any preceding clause, wherein the first power subsystem has a first power converter electrically connected to the first electric machine and a second power converter electrically connected to the second electric machine.

6. The power system of any preceding clause, wherein the first power converter and the second power converter are co-located.

7. The power system of any preceding clause, wherein the first power converter and the second power converter are spaced from one another and are electrically coupled by a DC bus.

8. The power system of any preceding clause, wherein the vehicle has a vehicle body and one or more electrical loads, and wherein the vehicle is an aircraft and the vehicle body includes a fuselage and a wing extending from the fuselage, and wherein a nacelle of the gas turbine engine is mounted to the wing via a pylon, the one or more electrical loads being positioned onboard the vehicle body but offboard the nacelle and the pylon.

9. The power system of any preceding clause, wherein the first spool is a high pressure spool and the second spool is a low pressure spool of the gas turbine engine, the third electric machine being mechanically coupled with the first spool, and wherein the first power converter and the second power converter are positioned onboard the nacelle, the pylon, or both.

10. The power system of any preceding clause, wherein the first spool is a high pressure spool and the second spool is a low pressure spool of the gas turbine engine, the third electric machine being mechanically coupled with the first spool, and wherein the first power converter and the second power converter are positioned onboard the fuselage.

11. The power system of any preceding clause, wherein a first line electrically connects the first electric machine with the first power converter and a second line electrically connects the second electric machine with the second power converter, a first contactor being disposed along the first line and being positioned onboard the fuselage and a second contactor being disposed along the second line and being positioned onboard the fuselage.

12. The power system of any preceding clause, wherein the first spool is a high pressure spool and the second spool is a low pressure spool of the gas turbine engine, the third electric machine being mechanically coupled with the second spool, and wherein the first power converter and the second power converter are positioned onboard the nacelle, the pylon, or both.

13. The power system of any preceding clause, wherein the first spool is a high pressure spool and the second spool is a low pressure spool of the gas turbine engine, the third electric machine being mechanically coupled with the second spool, and wherein the first power converter and the second power converter are positioned onboard the fuselage.

14. The power system of any preceding clause, wherein a first line electrically connects the first electric machine with the first power converter and a second line electrically connects the second electric machine with the second power converter, a first contactor being disposed along the first line and being positioned onboard the fuselage and a second contactor being disposed along the second line and being positioned onboard the fuselage.

15. The power system of any preceding clause, wherein the first power subsystem has a first AC bus electrically connected with the first electric machine, a second AC bus electrically connected with the second electric machine, and an AC/AC converter electrically connected to the first AC bus and the second AC bus to convert alternating current transmitted between the first electric machine and the second electric machine.

16. The power system of any preceding clause, wherein the first electric machine, the second electric machine, and the third electric machine are each coupled to a different spool of the at least two spools.
17. The power system of any preceding clause, wherein the third electric machine is mechanically coupled to one of the first spool and the second spool.
18. The power system of any preceding clause, wherein the vehicle has a vehicle body, and wherein a DC link is positioned between the third electric machine and a main AC bus positioned onboard the vehicle body.
19. A vehicle, comprising: a vehicle body; one or more electrical loads positioned onboard the vehicle body; a gas turbine engine mounted to the vehicle body, the gas turbine engine having at least two spools; and a power system, comprising: a first power subsystem having a first electric machine mechanically coupled with a first spool of the at least two spools and a second electric machine mechanically coupled with a second spool of the at least two spools, the second electric machine being electrically coupled with the first electric machine such that electrical power is transmittable therebetween; a second power subsystem having a third electric machine mechanically coupled with one of the at least two spools, the third electric machine being electrically coupled with the one or more electrical loads such that electrical power is transmittable therebetween, and wherein the first power subsystem and the second power subsystem are electrically decoupled from one another.
20. The vehicle of any preceding clause, wherein the first spool is a high pressure spool and the second spool is a low pressure spool of the gas turbine engine, and wherein the third electric machine is mechanically coupled with the first spool.
21. The vehicle of any preceding clause, wherein the gas turbine engine further comprises an accessory gearbox mechanically coupling one or both of the first electric machine and the third electric machine to the high pressure spool.
22. The vehicle of any preceding clause, wherein the first spool is a high pressure spool and the second spool is a low pressure spool of the gas turbine engine, and wherein the third electric machine is mechanically coupled with the second spool.
23. The vehicle of any preceding clause, wherein the first power subsystem has a first power converter electrically connected to the first electric machine and a second power converter electrically connected to the second electric machine.
24. The vehicle of any preceding clause, wherein the first power converter and the second power converter are co-located.
25. The vehicle of any preceding clause, wherein the first power converter and the second power converter are spaced from one another and are electrically coupled by a DC bus.
26. The vehicle of any preceding clause, wherein the vehicle is an aircraft and the vehicle body includes a fuselage and a wing extending from the fuselage, and wherein a nacelle of the gas turbine engine is mounted to the wing via a pylon, the one or more electrical loads being positioned offboard the nacelle and the pylon.
27. The vehicle of any preceding clause, wherein the first spool is a high pressure spool and the second spool is a low pressure spool of the gas turbine engine, the third electric machine being mechanically coupled with the first spool, and wherein the first power converter and the second power converter are positioned onboard the nacelle, the pylon, or both.
28. The vehicle of any preceding clause, wherein the first spool is a high pressure spool and the second spool is a low pressure spool of the gas turbine engine, the third electric machine being mechanically coupled with the first spool, and wherein the first power converter and the second power converter are positioned onboard the fuselage.
29. The vehicle of any preceding clause, wherein a first line electrically connects the first electric machine with the first power converter and a second line electrically connects the second electric machine with the second power converter, a first contactor being disposed along the first line and being positioned onboard the fuselage and a second contactor being disposed along the second line and being positioned onboard the fuselage.
30. The vehicle of any preceding clause, wherein the first spool is a high pressure spool and the second spool is a low pressure spool of the gas turbine engine, the third electric machine being mechanically coupled with the second spool, and wherein the first power converter and the second power converter are positioned onboard the nacelle, the pylon, or both.
31. The vehicle of any preceding clause, wherein the first spool is a high pressure spool and the second spool is a low pressure spool of the gas turbine engine, the third electric machine being mechanically coupled with the second spool, and wherein the first power converter and the second power converter are positioned onboard the fuselage.
32. The vehicle of any preceding clause, wherein a first line electrically connects the first electric machine with the first power converter and a second line electrically connects the second electric machine with the second power converter, a first contactor being disposed along the first line and being positioned onboard the fuselage and a second contactor being disposed along the second line and being positioned onboard the fuselage.
33. The vehicle of any preceding clause, wherein the first power subsystem has a first AC bus electrically connected with the first electric machine, a second AC bus electrically connected with the second electric machine, and an AC/AC converter electrically connected to the first AC bus and the second AC bus to convert alternating current transmitted between the first electric machine and the second electric machine.
34. The vehicle of any preceding clause, wherein the first electric machine, the second electric machine, and the third electric machine are each coupled to a different spool of the at least two spools.
35. The vehicle of any preceding clause, wherein the third electric machine is mechanically coupled to one of the first spool and the second spool.
36. The vehicle of any preceding clause, wherein a DC link is positioned between the third electric machine and a main AC bus positioned onboard the vehicle body.
37. A method of vehicle power transmission, comprising: transferring, by a first power subsystem, power between a first spool and a second spool of at least two spools of a gas turbine engine by transmitting electrical power generated by a first electric machine mechanically coupled with the first spool to a second electric machine mechanically coupled with the second spool; and transmitting, by a second power subsystem, electrical power generated by a third electric machine mechanically coupled with one of the at least two spools to one or more loads positioned offboard the gas turbine engine, and wherein the first power subsystem and the second power subsystem are electrically decoupled from one another.

38. An aircraft, comprising: a fuselage; a wing extending from the fuselage; a gas turbine engine mounted to the wing, the gas turbine engine having at least two spools; one or more electrical loads positioned offboard the gas turbine engine; a power system associated with the gas turbine engine, the power system comprising: a first power subsystem having a first electric machine mechanically coupled with a first spool of the at least two spools and a second electric machine mechanically coupled with a second spool of the at least two spools, the second electric machine being electrically coupled with the first electric machine such that electrical power is transmittable therebetween; a second power subsystem having a third electric machine mechanically coupled with one of the at least two spools, the third electric machine being electrically coupled with the one or more electrical loads such that electrical power is transmittable therebetween, and wherein the first power subsystem and the second power subsystem are electrically decoupled from one another.

We claim:
1. An aircraft, comprising:
a fuselage;
a wing extending from the fuselage;
a gas turbine engine mounted to the wing or to the fuselage, the gas turbine engine having a high pressure spool and a low pressure spool;
one or more electrical loads positioned offboard the gas turbine engine; and
a power system associated with the gas turbine engine, the power system comprising:
 a first power subsystem having a first electric machine mechanically coupled with the high pressure spool and a second electric machine mechanically coupled with the low pressure spool, the second electric machine being electrically coupled with the first electric machine such that electrical power is transmittable therebetween; and
 a second power subsystem having a third electric machine mechanically coupled with the high pressure spool, the third electric machine being electrically coupled with the one or more electrical loads such that electrical power is transmittable therebetween,
 wherein the first power subsystem and the second power subsystem are electrically decoupled from one another.
2. The aircraft of claim 1, wherein the gas turbine engine defines an axial direction, and wherein the second electric machine is positioned aft of both the first electric machine and the third electric machine along the axial direction.
3. The aircraft of claim 1, wherein the gas turbine engine has a combustion section and defines an axial direction, and wherein the first electric machine is positioned forward of the combustion section along the axial direction, and the second electric machine and the third electric machine are positioned aft of the of the combustion section along the axial direction.
4. The aircraft of claim 1, wherein the first power subsystem has a first power converter electrically connected to the first electric machine and a second power converter electrically connected to the second electric machine.
5. The aircraft of claim 4, wherein the first power converter and the second power converter are co-located.
6. The aircraft of claim 4, wherein the first power converter and the second power converter are spaced from one another and are electrically coupled with one another by a DC bus.
7. The aircraft of claim 1, wherein the first power subsystem has a first power converter electrically connected to the first electric machine and a second power converter electrically connected to the second electric machine, the first power converter being electrically coupled with the second power converter via a bus, and
 wherein a nacelle of the gas turbine engine is mounted to the wing via a pylon, and wherein the one or more electrical loads are positioned offboard the nacelle and the pylon.
8. The aircraft of claim 7, wherein the first power converter and the second power converter are positioned onboard the fuselage.
9. The aircraft of claim 8, wherein a first line electrically connects the first electric machine with the first power converter and a second line electrically connects the second electric machine with the second power converter, a first contactor being disposed along the first line and being positioned onboard the fuselage and a second contactor being disposed along the second line and being positioned onboard the fuselage.
10. The aircraft of claim 1, further comprising:
a second wing extending from the fuselage;
a second gas turbine engine mounted to the second wing or to the fuselage, the second gas turbine engine having at least two spools; and
a second power system associated with the second gas turbine engine, the second power system comprising:
 a first power subsystem having a first electric machine mechanically coupled with a first spool of the at least two spools of the second power system and a second electric machine mechanically coupled with a second spool of the at least two spools of the second power system, the second electric machine of the second power system being electrically coupled with the first electric machine of the second power system such that electrical power is transmittable therebetween; and
 a second power subsystem having a third electric machine mechanically coupled with one of the at least two spools of the second power system, the third electric machine of the second power system being electrically coupled with the one or more electrical loads such that electrical power is transmittable therebetween,
 wherein the first power subsystem and the second power subsystem of the second power system are electrically decoupled from one another.
11. The aircraft of claim 1, wherein the first electric machine and the third electric machine are co-axially mounted to and rotatable with the high pressure spool.
12. A power system associated with a gas turbine engine mounted to an aircraft, the power system comprising:
a first power subsystem having a first electric machine mechanically coupled with a high pressure spool of the gas turbine engine and a second electric machine mechanically coupled with a low pressure spool of the gas turbine engine, the second electric machine being electrically coupled with the first electric machine such that electrical power is transmittable therebetween; and a second power subsystem having a third electric machine mechanically coupled with the high pressure spool, the third electric machine being electrically coupled with one or more electrical loads positioned offboard the gas turbine engine, and wherein the first power subsystem and the second power subsystem are electrically decoupled from one another.

13. A method of power transmission for an aircraft, comprising:

transferring, by a first power subsystem, power between a high pressure spool and a low pressure spool of a gas turbine engine by transmitting electrical power generated by a first electric machine mechanically coupled with the high pressure spool to a second electric machine mechanically coupled with the low pressure spool; and transmitting, by a second power subsystem, electrical power generated by a third electric machine mechanically coupled with the high pressure spool to one or more loads positioned offboard the gas turbine engine, and wherein the first power subsystem and the second power subsystem are electrically decoupled from one another.

* * * * *